United States Patent [19]
Young et al.

[11] Patent Number: 5,463,877
[45] Date of Patent: Nov. 7, 1995

[54] DISPENSER HAVING EDGE-LIGHTED, TRANSPARENT VALVE FOR PRODUCT DISPLAY

[75] Inventors: William C. Young; Kerwin Barngrover, both of Topeka, Kans.

[73] Assignee: Wilch Manufacturing, Inc., Topeka, Kans.

[21] Appl. No.: 275,040

[22] Filed: Jul. 14, 1994

[51] Int. Cl.$^6$ ............................................. F25D 27/00
[52] U.S. Cl. ........................ 62/264; 222/146.6; 362/96
[58] Field of Search ........................... 62/264; 362/96, 362/85; 137/557; 222/154, 156, 146.6

[56] References Cited

U.S. PATENT DOCUMENTS

| | | | |
|---|---|---|---|
| 869,551 | 10/1907 | Cole | 62/264 X |
| 1,654,841 | 1/1928 | Smith | 62/264 X |
| 1,762,126 | 6/1930 | Smith | 222/154 X |
| 1,796,916 | 3/1931 | Bonnheim | 62/264 X |
| 2,199,196 | 4/1940 | Evans | 222/156 X |
| 2,655,286 | 10/1953 | Barbaro | 222/156 X |
| 3,217,709 | 11/1965 | Schneider et al. | 222/156 X |
| 3,989,492 | 11/1976 | Keyes | 62/342 X |
| 4,391,309 | 7/1983 | Steiner | 222/154 X |
| 4,949,230 | 8/1990 | Burmeister | 362/85 X |

*Primary Examiner*—William E. Tapolcai
*Attorney, Agent, or Firm*—Hovey, Williams, Timmons & Collins

[57] ABSTRACT

A frozen product dispenser apparatus is provided with a housing which presents a front panel and includes a freezing chamber extending rearward from the front panel. A valve body is positioned to close off the freezing chamber. The valve body supports a valve for movement between closed and open positions, and a handle for operating the valve. The valve body includes an edge wall extending around the body, and is substantially transparent so that the frozen product is visible through the body. A light assembly is provided on the apparatus for lighting the edge wall of the valve body to illuminate the frozen product for display.

5 Claims, 3 Drawing Sheets

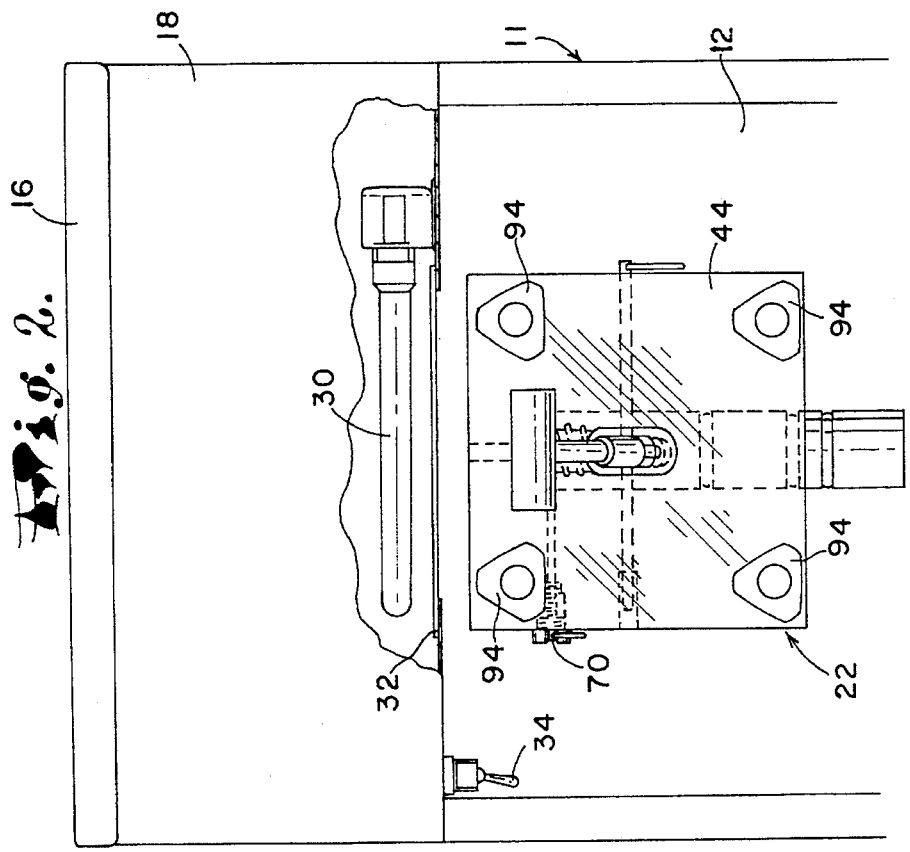
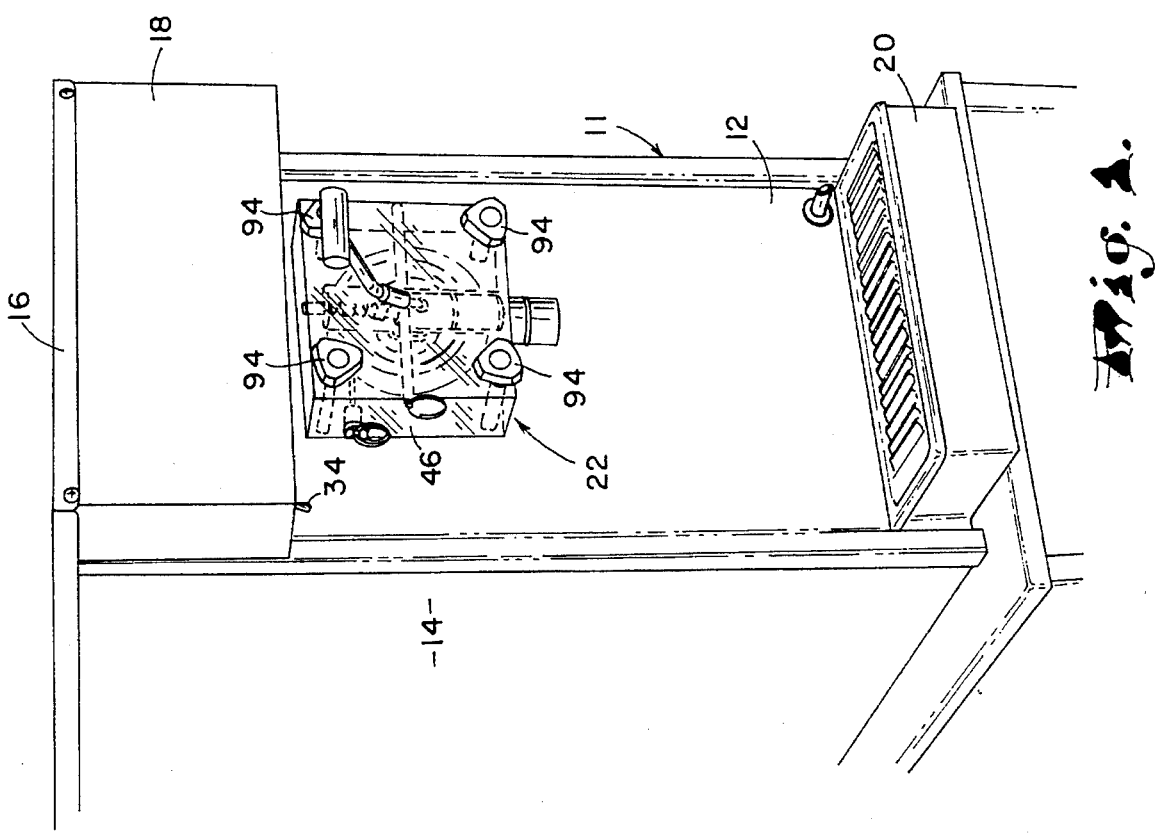

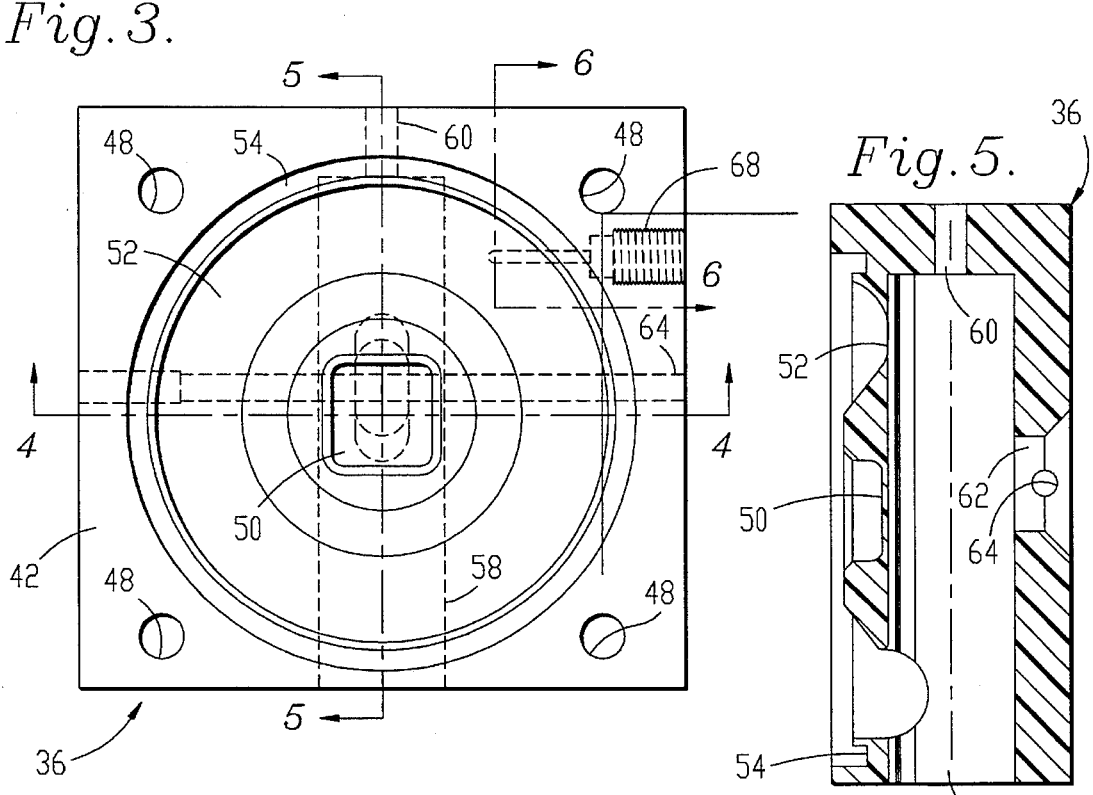
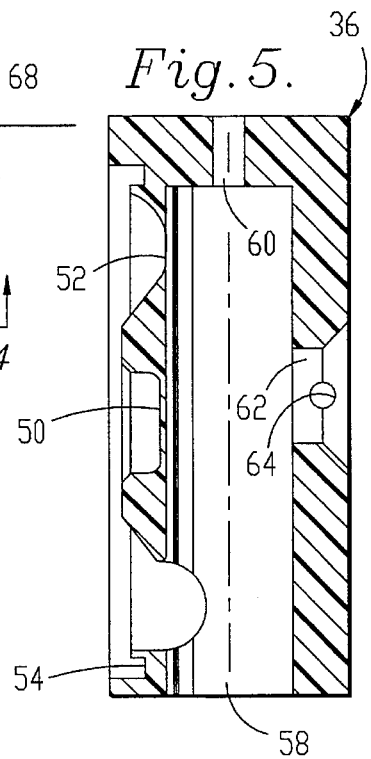
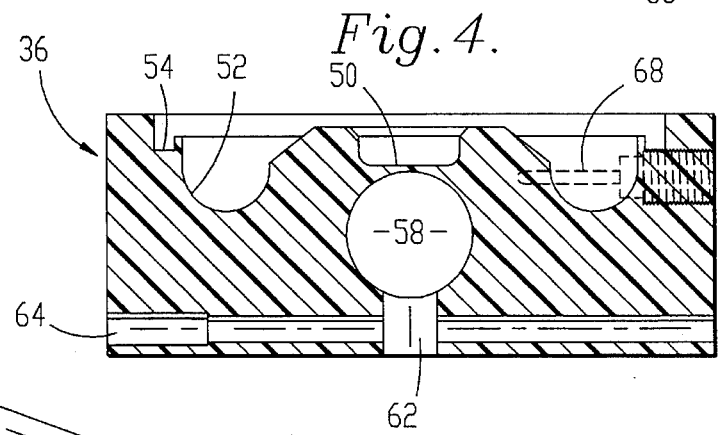
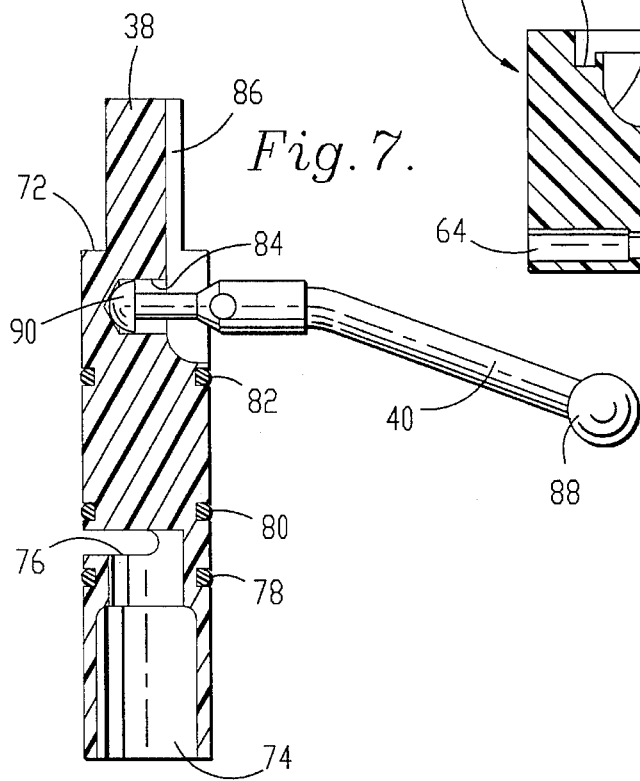
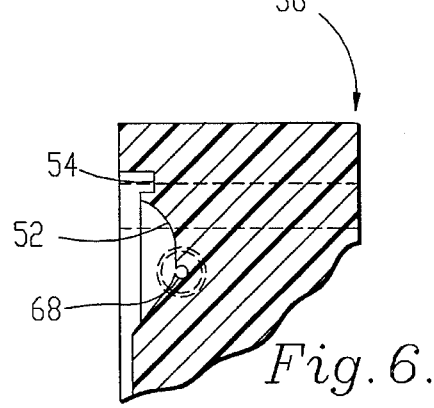

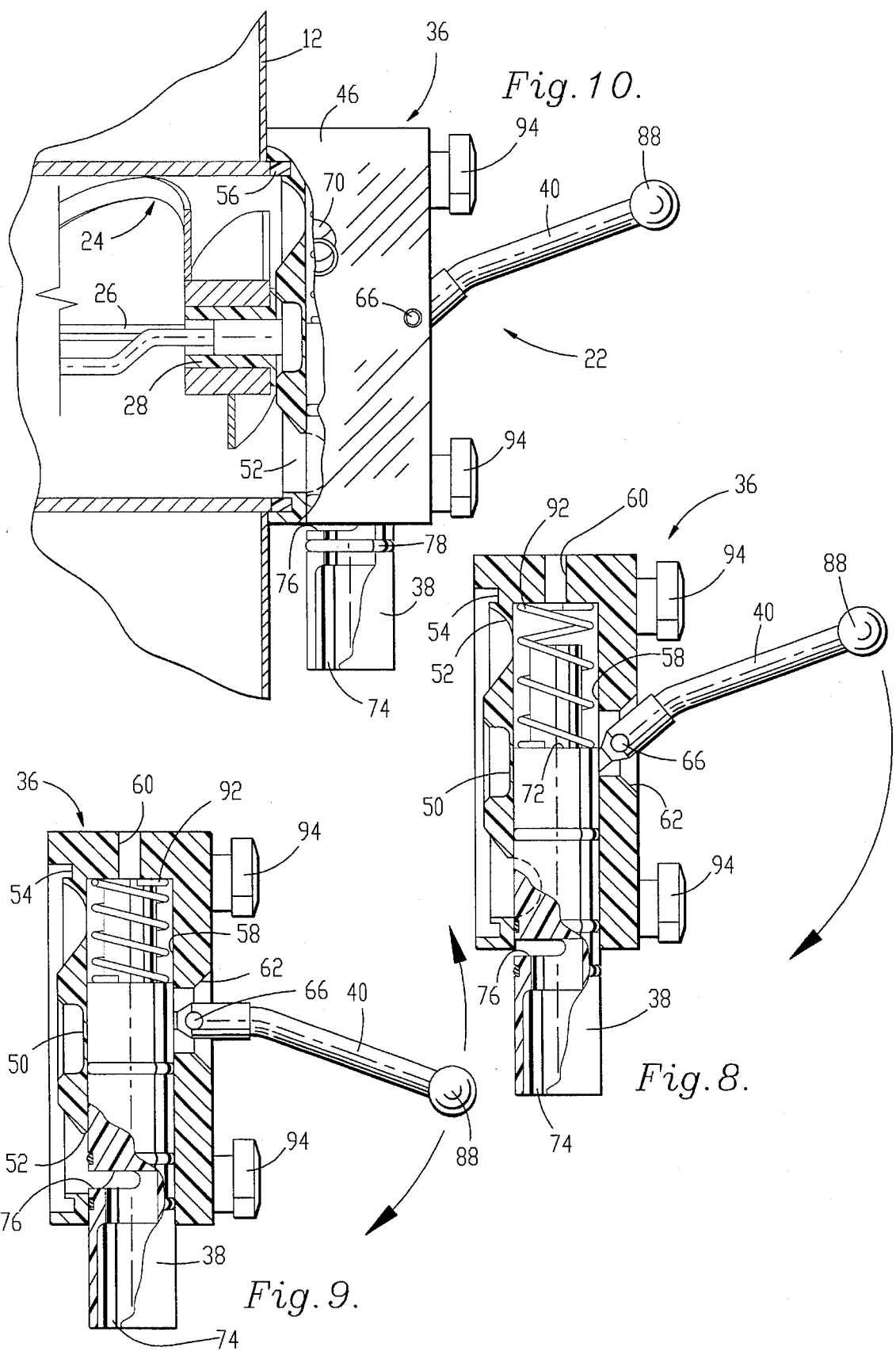

DISPENSER HAVING EDGE-LIGHTED, TRANSPARENT VALVE FOR PRODUCT DISPLAY

BACKGROUND OF THE INVENTION

1. Field of the Invention

The present invention relates to frozen product dispensers and, more particularly, to a frozen product dispenser having an edge-lighted, transparent valve assembly which displays the product stored in the dispenser.

2. Discussion of the Prior Art

It is conventional to provide a frozen product dispenser designed particularly for use in dispensing frozen beverages or soft serve. Such dispensers include an upstanding housing within which a freezing chamber is provided. A dispensing outlet is normally provided on the front of the housing, and includes a valve assembly for controlling the flow of frozen product.

The front of the housing in a conventional dispenser may include a window which permits an operator to view the frozen product in the freezing chamber. Some devices also include mixing assemblies within the freezing chamber for mixing the product, and these mixing elements are also sometimes visible through the window.

Conventional dispenser constructions allow inspection of the product and present it in a manner suitable for use in convenience stores and the like, where the consumer is able to walk up to the device, view the product, and dispense a desired amount. However, such devices are ill-suited for use in restaurants and lounges, where the dispenser is located several feet or yards from the patrons. In such instances, it is necessary to provide a device that illuminates and highlights the displayed product so that it is easier for consumers to identify the product from a distance.

OBJECTS AND SUMMARY OF THE INVENTION

It is an object of the present invention to provide a dispenser apparatus that illuminates a frozen product stored therein, and allows consumers to see the product from a distance and from any of several different angles.

It is another object of the invention to provide a dispenser apparatus having a valve assembly that allows observation of the frozen product, while being easy to use and to clean.

In accordance with these and other objects evident from the following description of a preferred embodiment, a frozen product dispenser apparatus is provided which includes a housing having a front panel and a freezing chamber extending rearward from the front panel. A valve body is positionable over the freezer chamber, which extends through the front panel, and closes off the front of the freezing chamber. The valve body includes an edge wall extending around the body, and is substantially transparent so that the frozen product is visible through the body.

A fastening means is provided for fastening the valve body to the housing, and a valve is supported on the valve body for movement between a flow-preventing position in which the valve is closed, and a flow-permitting position in which the valve is open. An actuating means is provided for moving the valve between the flow-permitting and flow-preventing positions. The apparatus also includes a lighting means for lighting the edge wall of the valve body to illuminate the frozen product for display.

Numerous advantages are obtained by employing a construction in accordance with the present invention. For example, by providing a substantially transparent valve body on which a valve is supported, a construction results which permits the product stored in the chamber to be viewed from any of several angles around the front of the dispenser. In addition, by providing a lighting means for lighting the edge wall of the valve body, the product itself is illuminated, allowing the product to be seen from a distance of several feet or yards from the apparatus. The lighting means also illuminates any glass or cup placed beneath the valve body during use, and thus facilitates use of the apparatus in dark locations such as cocktail lounges.

Preferably, the valve body includes a rear surface exposed to the freezing chamber, wherein the rear surface includes a concavity defining an extension of the chamber so that product stored in the chamber fills the concavity forward of the front panel of the housing. This construction allows the product to be stored within the transparent valve body such that illumination of the product is enhanced.

BRIEF DESCRIPTION OF THE DRAWING FIGURES

A preferred embodiment of the present invention is described in detail below with reference to the attached drawing figures, wherein:

FIG. 1 is a perspective view of a frozen product dispenser apparatus constructed in accordance with the preferred embodiment;

FIG. 2 is a fragmentary front elevational view of the apparatus;

FIG. 3 is a rear elevational view of a valve body forming a part of the apparatus;

FIG. 4 is a sectional view taken along line 4—4 of FIG. 3;

FIG. 5 is a sectional view taken along line 5—5 of FIG. 3;

FIG. 6 is a sectional view taken along line 6—6 of FIG. 3;

FIG. 7 is a sectional view of a valve forming a part of the apparatus;

FIG. 8 is a sectional view of the valve and valve body of the apparatus, illustrating the valve in a closed position;

FIG. 9 is a sectional view of the valve and valve body of the apparatus, illustrating the valve in the open position; and FIG. 10 is a fragmentary side elevational view, partially in section, of the apparatus.

DETAILED DESCRIPTION OF THE PREFERRED EMBODIMENT

A frozen product dispenser apparatus constructed in accordance with the preferred embodiment is illustrated in FIG. 1. The apparatus includes an upright housing 11 having front and side panels 12, 14, a top panel 16, a cover assembly 18, and a drain 20. A valve assembly 22 is mounted on the front panel 12, and allows access to a frozen product stored in a chamber 21 supported by the housing. Although not shown, a refrigeration apparatus may also be provided for maintaining a desired temperature in the chamber.

Turning to FIG. 10, the housing 11 is illustrated as including a mixing means for mixing product within the chamber 21. The mixing means preferably includes a dasher assembly 24, a stator 26, and a plastic bushing 28. The dasher assembly 24 is supported on the stator by the bushing, and is rotatable within the chamber to mix the product. A conventional drive motor is provided for rotating the dasher assembly during use.

The cover assembly 18 is shown in FIG. 1, and extends out over the front panel of the housing. As shown in FIG. 2, the cover assembly includes a lamp 30 and a lens 32 supported above the valve assembly 22 for illuminating the assembly during operation. A switch 34 is also provided on the cover assembly for controlling power to the apparatus. Preferably, the lamp 30 is a fluorescent lamp, and the lens 32 is a sheet of translucent material so that the light reaching the valve body is softened relative to the light from the lamp.

The valve assembly 22 is illustrated in FIG. 10, and broadly includes a valve body 36, a valve 38 supported on the body for movement between closed and open positions, and a handle 40 which moves with the valve.

The valve body 36 is formed of a unitary piece of transparent material, such as a transparent thermoplastic resin or the like, and is formed in the shape of a rectangular block. The body includes a rear surface 42, illustrated in FIG. 3, which is adapted to face the front panel of the housing when the body is secured in place. A front surface 44, shown in FIG. 2, opposes the rear surface, and is substantially parallel thereto. The front and rear surfaces are spaced from one another by a distance of 2–3 inches, as shown in FIG. 1, and an edge wall 46 extends between the surfaces. The edge wall is four-sided, and each side presents a smooth, flat, rectangular surface through which it is possible to see into the valve body.

Returning to FIG. 3, the valve body 36 includes four holes 48 extending between the front and rear surfaces, and these holes are used to secure the valve assembly to the front panel of the housing. The rear surface 42 of the valve body includes a central, square-shaped recess 50 in which the stator of the mixing means is received. The rear surface also includes a concavity 52 defining an extension of the tank so that product stored in the chamber 21 fills the concavity. This concavity 52 is annular in shape and, as shown in FIG. 4, includes an arcuate radiused surface so that when product is received in the concavity it is visible through both the front and edge walls.

An annular groove 54 is formed in the rear surface of the body around the concavity 52, and includes a square cross-sectional shape adapted to receive a square-shaped 0-ring seal 56, as shown in FIG. 10. This seal prevents product from leaking from between the freezing chamber 21 and the valve body 36.

As shown in FIG. 5, the body 36 includes a vertical bore 58 that is centrally located between the front and rear surfaces 44, 42 and between opposing lateral sides of the edge wall. The central bore 58 extends upward from the lower side of the edge wall to a height slightly below the upper side of the edge wall. A vent 60 communicates between the central bore and the upper side of the edge wall.

The annular concavity 52 formed in the rear surface of the body communicates with the central bore 58 along the lower portion of the concavity, but is shallow enough along the upper region that it does not open up into the central bore at the top of the concavity. The communication between the concavity and the bore defines an outlet through which frozen product may be dispensed.

A front opening 62 is provided about halfway up the front surface of the body, and communicates with the central bore 58. This opening 62 is adapted to receive the handle 40, as shown in FIG. 2. A transverse bore 64 extends between the laterally opposed sides of the edge wall, as shown in FIG. 4, and communicates with the front opening 62. The transverse bore 64 is adapted to receive a pin 66, as shown in FIG. 8, on which the handle is supported for pivotal movement. As shown in FIG. 6, a pressure vent 68 extends inward from one lateral side of the edge wall, and communicates with the annular concavity 52. As shown in FIG. 2, a plug 70 may be provided for closing this vent off when desired.

The valve 38 is illustrated in FIG. 7, and includes an elongated plunger having a small diameter end defining a spring seat 72, and a hollow, tubular large diameter end defining an outlet passage 74. The outlet passage extends axially inward from the large diameter end of the plunger, and a transverse port 76 is provided in the side of the plunger which communicates with the passage 74.

Three circumferential grooves are formed in the plunger, and are adapted to receive O-ring seals 78, 80, 82 for sealing the space between the plunger and the central bore of the valve body when the plunger is positioned in the bore. One of the seals 78 is provided between the port 76 and the large diameter end of the plunger, while the other two seals 80, 82 are disposed between the port 76 and the spring seat 72.

A transverse bore 84 extends partially into the plunger in a direction generally transverse to the length of the plunger, and at a position located between the upper O-ring seal 82 and the spring seat 72. A slot 86 extends axially inward from the small diameter end of the plunger to a point between the transverse bore 84 and the upper O-ring seal 82, and receives the handle to permit relative movement between the handle and the plunger.

The handle 40 is supported on the pin 66 for pivotal movement, and includes a gripping portion 88 at one end and an opposed free end 90. The free end is rounded, and is received within the bore 84 of the plunger so that when the handle is pivoted about the pin 66, the end 90 of the handle forces the plunger to move axially within the bore.

As shown in FIG. 8, a compression spring 92 is provided between the plunger 38 and the upper end of the central bore 58. The spring 92 is supported by the seat 72 and the valve body 36, and biases the plunger 38 downward toward the closed, flow-preventing position. The force of the spring is sufficient to move the plunger and handle from the open, flow-permitting position, shown in FIG. 9, to the closed position shown in FIG. 8. Thus, when a user releases the handle, the valve automatically moves to the closed position.

As illustrated in FIG. 10, the valve assembly 22 is secured in place on the front panel 12 of the housing 11 in overlying relationship with the freezing chamber. Four threaded fasteners 94 are provided, as shown in FIG. 2, for holding the valve assembly in place and for permitting easy removal of the valve assembly for cleaning. Preferably, these threaded fasteners 94 are provided with large heads that may be easily manipulated manually without the use of tools.

Once the valve assembly is secured in place, and the chamber 21 has been filled with a frozen product, it is possible to dispense the product simply by pulling down on the handle 40. When this is done, the outlet passage 74 is brought into communication with the annular concavity 52 via the port 76, as shown in FIG. 9, and product is allowed to flow through the passage from the apparatus.

After the desired amount of product has been dispensed, the user either lifts the handle 40, or releases it so that the spring 92 will move the plunger back to the closed position, as shown in FIG. 8.

By providing a transparent valve body 36 having a concavity communicating with the tank, frozen product is actually stored within the valve body and may be seen through either the front or edge wall from any angle. Thus, the valve body is more than a simple window to the chamber, but actually forms a part of the chamber, facilitating observation of the frozen product.

Further, by providing the lamp and lens above the upper side of the edge wall, the product is actually illuminated through the valve body 36, and may be easily seen from a distance. Thus, even if a consumer is several feet or yards from the dispenser apparatus, such as in a restaurant or lounge, it is possible to see the product in the dispenser. The lamp and lens also serve to illuminate any glass or cup placed beneath the valve body for filling.

Although the present invention has been described with reference to the preferred embodiment illustrated in the attached drawing figures, it is noted that substitutions may be made and equivalents employed herein without departing from the scope of the invention as recited in the claims.

What is claimed is:

1. A frozen product dispenser apparatus comprising:

a housing presenting a front panel and including a freezing chamber extending rearward from the front panel;

a valve body positionable to close off the freezing chamber, and including an edge wall extending around the body, and a rear surface exposed to the freezing chamber, the rear surface including a concavity defining an extension of the chamber so that product stored in the tank fills the concavity, the valve body being substantially transparent so that the frozen product is visible through the body;

a fastening means for fastening the valve body to the housing;

a valve supported on the valve body for movement between a flow-preventing position and a flow-permitting position;

an actuating means for moving the valve between the flow-permitting and flow-preventing position; and a lighting means for lighting the edge wall of the valve body to illuminate the frozen product for display.

2. A dispenser apparatus as recited in claim 1, wherein the concavity is an annular groove having a radiused surface.

3. A dispenser apparatus as recited in claim 1, further comprising a mixing means for mixing the frozen product within the chamber, the rear surface of the valve body including a seat for supporting the mixing means.

4. A dispenser apparatus as recited in claim 1, wherein the housing includes a cover assembly extending over the valve body, the lighting means being disposed within the cover assembly and including a lamp, and a lens for directing light from the lamp onto the edge wall of the valve body.

5. A frozen product dispenser apparatus comprising:

a housing presenting a front panel and including a freezing chamber extending rearward from the front panel;

a valve body positionable to close off the freezing chamber, the valve body including an edge wall extending around the body and a rear surface exposed to the freezing chamber, the rear surface including a concavity defining an extension of the chamber so that product stored in the tank fills the concavity, the valve body being substantially transparent so that the frozen product is visible through the body;

a fastening means for fastening the valve body to the housing;

a valve supported on the valve body for movement between a flow-preventing position and a flow-permitting position;

an actuating means for moving the valve between the flow-permitting and flow-preventing position; and a lighting means for lighting the edge wall of the valve body to illuminate the frozen product for display, wherein the housing includes a cover assembly extending over the valve body, the lighting means being disposed within the hood assembly and including a lamp, and a lens for directing light from the lamp onto the edge wall of the valve body.

\* \* \* \* \*